United States Patent
Castro et al.

(10) Patent No.: US 7,543,000 B2
(45) Date of Patent: Jun. 2, 2009

(54) METHOD AND SYSTEM COMBINING STATE REPLICATION AND OPERATIONAL-REPLAY SYNCHRONIZATION

(75) Inventors: Paul C. Castro, Harrison, NY (US); Ravindranath Konuru, Tarrytown, NY (US); Avraham Leff, New Hempstead, NY (US); James T. Rayfield, Ridgefield, CT (US); Danny L. Yeh, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 11/337,393

(22) Filed: Jan. 23, 2006

(65) Prior Publication Data
US 2007/0185920 A1    Aug. 9, 2007

(51) Int. Cl.
*G06F 12/00*    (2006.01)
*G06F 17/30*    (2006.01)
(52) U.S. Cl. ..................................... 707/201
(58) Field of Classification Search ........................ None
See application file for complete search history.

(56) References Cited

U.S. PATENT DOCUMENTS 5,581,753 A * 12/1996 Terry et al. ................. 707/201

2004/0205759 A1 * 10/2004 Oka .......................... 718/102

OTHER PUBLICATIONS

John Steven, Pravir Chandra, Bob Fleck, Andy Podgurski, JRapture: A Capture/Replay Tool for Observation-Based Testing, Sep. 2000, ACM, ACM SIGSOFT Software Engineering Notes vol. 25 Issue 5.*
Patterson et al., Computer Organization & Design: The Hardware/Software Interface, Morgan Kaufmann Publishers, second edition, pp. 60-61.*

* cited by examiner

*Primary Examiner*—Pierre M Vital
*Assistant Examiner*—Jason Liao
(74) *Attorney, Agent, or Firm*—Scully, Scott, Murphy & Presser, P.C.; Kenneth R. Corsello, Esq.

(57) ABSTRACT

A system, method and computer program product for synchronizing replicas of shared data structures associated with one or more computer systems. The method comprises: evaluating a metric for performing a replica synchronization operation on a first computer system according to a first synchronization method; evaluating the metric for performing a replica synchronization operation on the first computer system according to a second synchronization method; and, selecting, at synchronization time, based on the evaluated metric, whether to use the first or second synchronization methods, and communicating a command to a second computer system to replicate a shared data structure based on the selected synchronization method.

22 Claims, 3 Drawing Sheets

METHOD AND SYSTEM COMBINING STATE REPLICATION AND OPERATIONAL-REPLAY SYNCHRONIZATION

BACKGROUND OF THE INVENTION

1. Field of the Invention

The present invention relates generally to the synchronization of shared data structures, e.g., databases, and, particularly a system and method for replicating a shared data structure across several computers to improve the availability and speed at which programs can access and operate on this shared data structure. More particularly, the invention relates to optimization among multiple synchronization algorithms.

2. Description of the Prior Art

In business environments, it is typical to require that operations on a data structure be grouped and executed as a transaction. Applications with this requirement are termed transactional applications. Transactional applications must satisfy the so-called ACID (Atomic, Consistent, Isolated, Durable) properties as described in J. Gray et al., "Transaction Processing: Concepts and Techniques," Morgan Kaufmann, 1993, ISBN 1558601902. Thus, a transaction may employ semantics that serve to satisfy the ACID properties such that the transaction is considered to be atomic (i.e., all or nothing), consistent (i.e., the data is never seen to be in an inconsistent state; e.g., An employee as a member of a nonexistent department), isolated (i.e., does not affect and is not affected by other transactions) and durable (i.e., will complete if the system fails or can be reversed). Without transactional semantics, concurrent clients may "step on" one another's data modifications with respect to an application. Examples of transactional applications include order entry, inventory, customer information, and human resources applications. When resident on a server, such applications allow multiple client computers to simultaneously access and operate on the shared information in a consistent manner. Examples of such clients are those supporting the Java 2 Platform, Micro Edition (J2ME) for consumer and embedded devices such as mobile phones, PDAs, TV set-top boxes, in-vehicle telematics systems, laptop computers, and workstations.

Requiring the transactional application's data structures to be solely resident on a single server simplifies the task of providing transactional semantics. However, it has the disadvantage of not performing well when the request rate from the client computers is high. It also does not enable the client computers to access the applications when they are disconnected from the server computer. These disadvantages can be overcome by replicating the data structures so that they are resident on the client computers as well as on the server. Then, clients can execute the transactional application locally rather than accessing the server. Such a scheme requires a synchronization infrastructure that propagates updates between the replicas such that all replicas converge to a common consistent state.

Transactions which satisfy the ACID properties are also called serializable (see Gray et al. supra), because the result of the execution of a sequence of transactions must correspond to a serial (non-overlapping) sequence of execution of the transactions against a single copy of the data structure. Thus, it is convenient to think in terms of a single server having the "master" replica of the database, and the clients having replicas of the database. The "authoritative" replica of the database is the server database, and client replicas must, after synchronization, correspond to the current (or near current) state of the server replica. Those skilled in the art recognize that this approach may be enhanced by partitioning the master replica across multiple servers (e.g. Server 1 has the master replica of employees A-M and the "slave" replica of employees N-Z, and server 2 has the master replica of employees N-Z and the slave replica of employees A-M). Additionally, a coordinator function which controls the master replica may be separated from the data itself (e.g. Server 1 has the data structure, but server 2 makes decisions about which updates are applied to the replica on server 1).

Note that, while in a distributed environment, clients connect to servers to access applications executing on those servers, this classification is not fixed. Typically, servers also assume the role of clients and connect to other servers to process a request submitted by their client computers. Thus, in distributed environments, computers take on the roles of client or server depending on the need. More generally, communications may take place on a peer-to-peer basis, rather than client-to-server.

As mentioned, there are broadly two common techniques for propagating the changes between two replicas. In the state-based approach, the changes made to one replica are logged in terms of the different items that have been modified (changed, deleted or created). During synchronization, the state changes are propagated from the first replica to the other replicas. Typically, in cases where the same item has been modified in more than one replica, or where an item with the same identifier has been added to two different instances, a conflict is generated that needs to be handled in an application-specific manner. Otherwise, the new and changed state is committed on the target replicas. An example of commercial software using such a state based replication is IBM DB2 Everyplace® (see http://www-306.ibm.com/software/data/db2/everyplace/).

In the operation-based approach, the operations performed on the data structure instance are logged along with the details of the arguments with which the operation was executed. For example, one operation may have a name "createOrder" and might take an item and a purchase order number as parameters. If the operations are being executed within a transaction, this information can also be logged. During synchronization, the log of operations is propagated from the modified replica to the other replicas, and the operation log from the modified replica is re-executed against the other replicas. Note that the operation log is executed against the current state of the other replicas. An example of a system which implements the operation-based approach may be found in "Programming Model Alternatives for Disconnected Business Applications", RC23347, available from http://domino.watson.ibm.com/library/cyberdig.nsf/Home.

Both synchronization techniques have characteristics that may make one better than the other in certain situations and environments. For example, the size of the state-change log versus the size of the operational log depends heavily on the application program. An application which grants each employee a five-percent raise as a single operation requires a very small operation log (one operation), but conversely requires a large state-change log (every employee salary has changed). Alternatively, an application that examines the entire database but makes no changes will require a zero-length state-change log but a non-zero-length (possibly large) operation log (e.g., if each employee was examined in a separate operation).

Similarly, operation-replay systems require the operations to be re-executed against each instance of the database, potentially consuming a lot of CPU time. In contrast, state-change logging may require less CPU time if the number of changes is small in comparison with the time to execute the operations.

Finally, state-based synchronization may be more prone to detection of false conflicts than operation-based synchronization systems. For example, if a bank account is debited in multiple replicas of the database, state-change logging will view this as a conflict. In contrast, operation-based synchronization will ultimately combine all the debits, and will not flag a conflict unless the account is overdrawn.

In the current state of the art and practice in this area of synchronization, practitioners and scientists have chosen one synchronization scheme or the other and have argued about the merits of one system over the other. However, it is clear from the above explanation that each technique has situations under which it outperforms the other in terms of commonly-used metrics such as CPU time and network bandwidth.

Accordingly there is a need to provide an overall system that can combine these two techniques into a hybrid synchronization method that can be used to choose the best technique dynamically based on the particular synchronization session.

SUMMARY OF THE INVENTION

The present invention is directed to a hybrid methodology and a system by which both state replication and operational replay replication approaches can be combined in a single system to provide the best possible approaches.

In accordance with the present invention, there is provided a system, method and computer program product for synchronizing replicas of shared data structures associated with one or more computer systems. The method comprises: evaluating a metric for performing a replica synchronization operation on a first computer system according to a first synchronization method; evaluating the metric for performing a replica synchronization operation on the first computer system according to a second synchronization method; and, selecting, at synchronization time, based on the evaluated metric, whether to use the first or second synchronization methods, and communicating a command to a second computer system to replicate a shared data structure based on the selected synchronization method.

More particularly, in the method and system for synchronization of replicated data structures, a selection is made, at synchronization time, whether to use a state-based synchronization or operation based synchronization, based on the states of the replicated data structure, the current environment, and other configuration information. For example, the system may decide to choose the replication methodology that provides the fewest conflicts, or the lowest bandwidth, or the lowest CPU time, overall synchronization time, etc. While the preferred embodiment pertains to intermittently-connected client-server environments, those skilled in the art will recognize that it also applies to any system in which replicas must be synchronized with each other; e.g., two replicas on the same computer.

Whenever a disconnected or intermittently-connected computer executes operations associated with a shared data structure, the system and method of the invention logs information related to both the operations (operation log) that are executed as well as a log of the state changes (state-change log) to the data structures that occurred as a result of executing the operations. The operation-log information includes the time taken to execute each operation, the size of the operation description in the log (including the operation identifier, return value, and parameters), and the transactional context when applicable. The state log includes the information about the data item that has been changed, the type of operation performed (e.g. create, update, delete, and read when necessary), the old and new values of the data item, a time stamp when needed, a transactional context when applicable, and the size of the state log entries. When the disconnected computer reconnects, the present invention dynamically decides which particular synchronization mechanism to use to reconcile the replicas, based on the information that has been logged during the disconnected execution, the connectivity characteristics, and the relative speeds of the two computers.

Advantageously, the present invention addresses the limitations of previously described state and operation based approach under different conditions and provides the methodology and system to combine the best of these contrasting approaches into a single hybrid synchronization strategy. Moreover, the present invention can be used either for optimizing the time taken to perform a synchronization or, optimize the amount of bandwidth consumed for a synchronization. Depending on a user situation and the cost and quality of bandwidth available, a user may want to optimize for one or the other. Other metrics are possible (e.g. minimize the amount of power consumed by a mobile device during synchronization).

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE PREFERRED EMBODIMENTS

The present invention provides a system, method and computer program product for synchronizing replicated data structures (e.g., databases), wherein the system selects, at synchronization time, whether to use a state-based synchronization or operational-replay synchronization, based on the states of the replication databases, the current environment, and other configuration information. For example, the system may decide to choose the replication methodology which provides the fewest conflicts, or the lowest bandwidth or, the lowest CPU time, etc.

Figure 1:
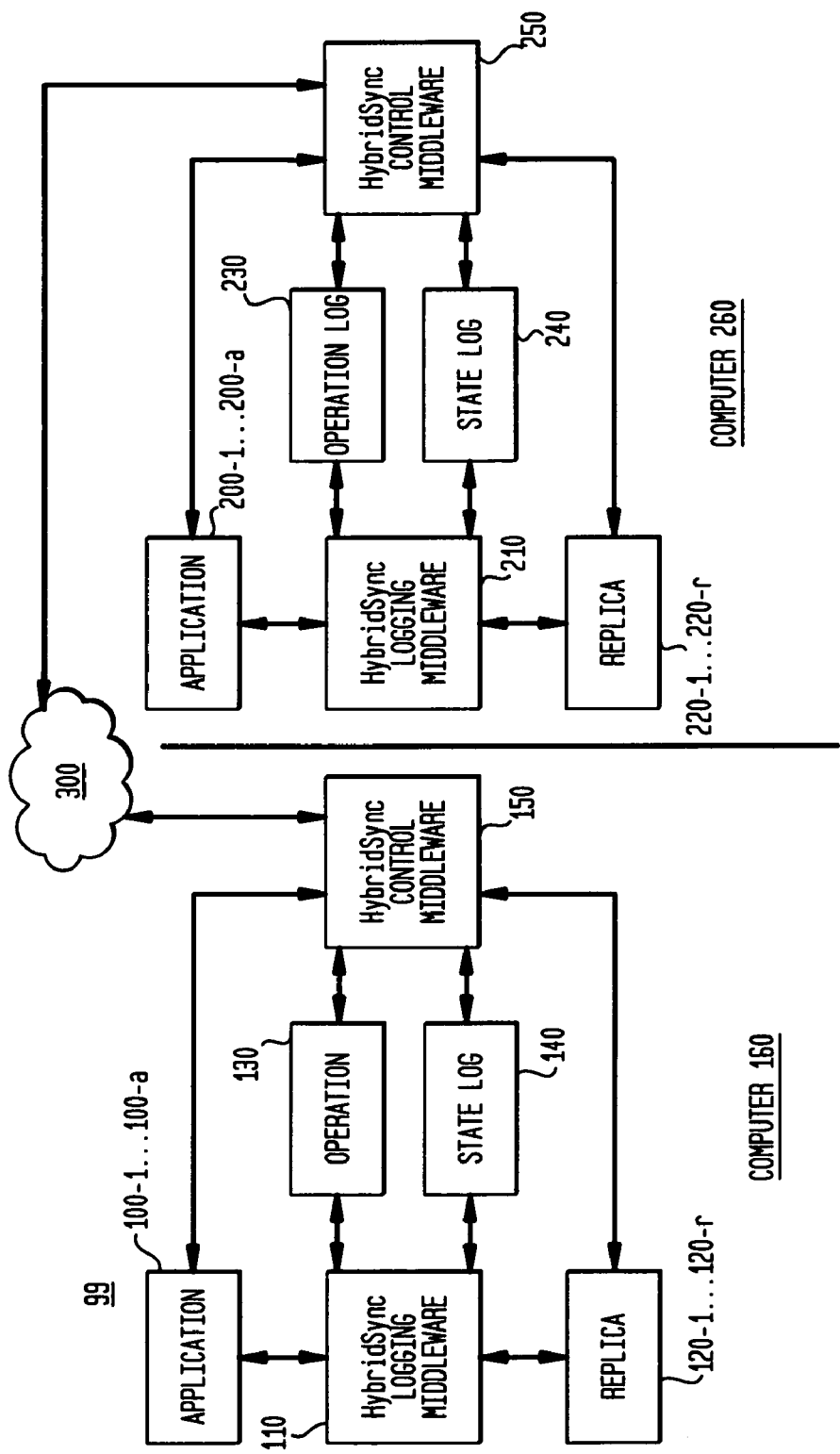
FIG. 1 is a block diagram of the system 99 in which the present invention is implemented.

Referring to FIG. 1, there is depicted a block diagram of one embodiment of the invention. While only two computer systems represented as computer system 160 and computer system 260 are shown in FIG. 1, it is understood that the invention is applicable to more one or more computers. Computer system 160 includes one or more Applications 100-1 through 100-$a$, and Replicas 120-1 through 120-$r$ which are replicas of database contents stored or associated with the computer system 160. An Application 100-$i$ communicates with a HybridSync Logging Middleware component 110, which generates an Operation Log 130 and State Log 140 as the Application 100-$i$ accesses and/or updates one or more Replicas 120-$j$. Similarly Computer 260 includes a HybridSync Logging Middlware component 210, Replicas 220-1 through 220-$r$ which are replicas of database contents stored or associated with the computer system 260, Operation Log 230, and State Log 240, structured in the same way as on Computer system 160.

As will be described, during synchronization operations, a HybridSync Control Middleware 150 on Computer 160 communicates with a HybridSync Control Middleware 250 on Computer 260 via Intermittently-Connected Network 300 to perform the synchronization algorithm described in greater detail herein below with respect to steps 400, 410 and 420 of FIG. 3. It is understood that the network may connect HybridSync Control Middleware components of several (i.e., more than two) computer systems. The network connection itself may be any network such as, but not limited to: the Internet, a LAN/WAN, (wired or wireless), an Intranet. With reference to the intermittently connected, the availability of network connectivity may be interrupted. For example, a wireless network may be interrupted by buildings or trees, and a laptop without a wireless connection may be temporarily disconnected from an Ethernet network. Moreover, while distributed computers, and disconnected computers are used, the invention also applies to particular topologies of distributed systems including those known as client/server systems and peer-to-peer system infrastructures.

Figure 2:
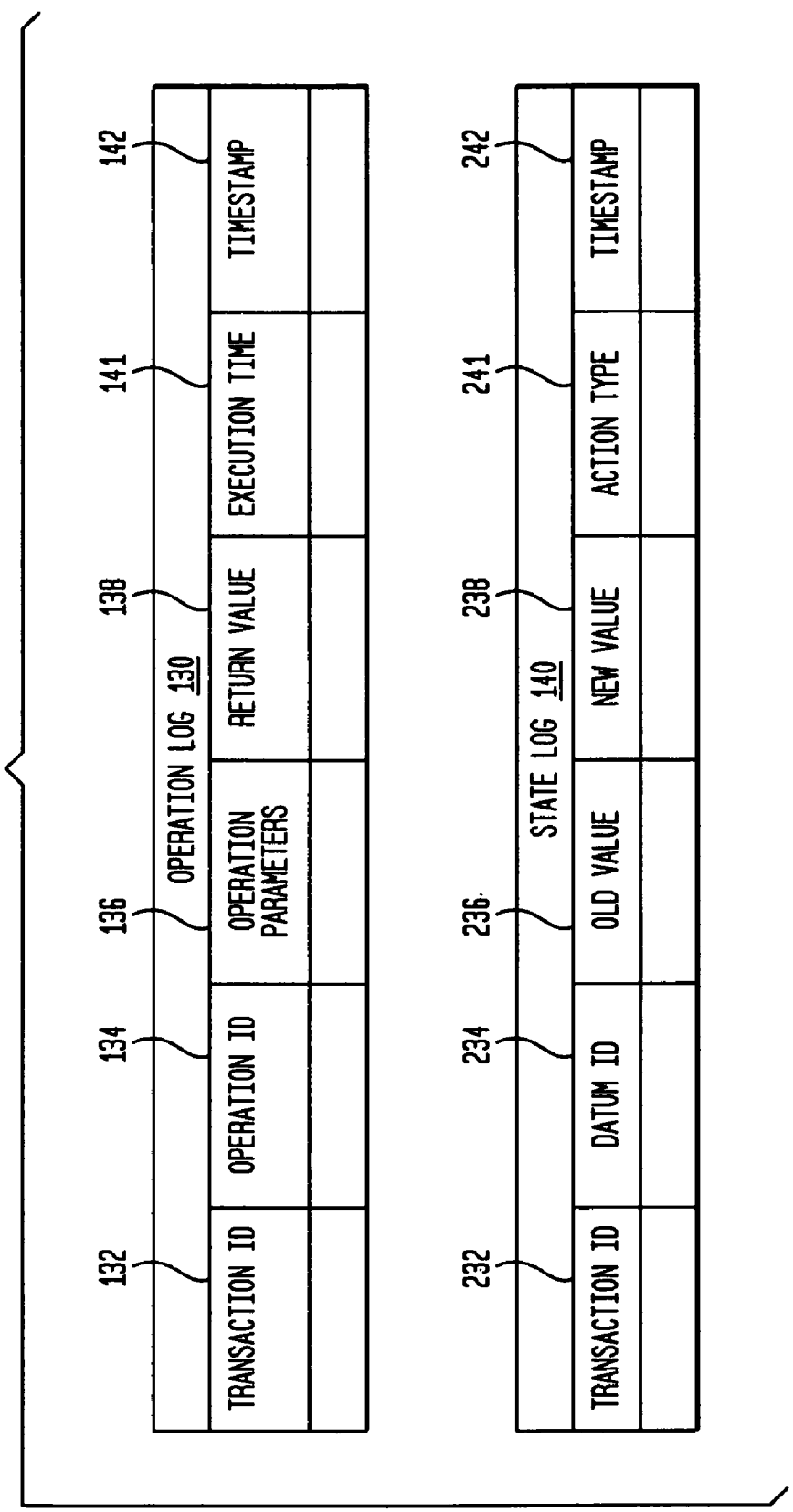
FIG. 2 depicts one embodiment for the Operational Log 130 and State Log 140 indicated in the system diagram of FIG. 1; and, FIG. 3 is a flowchart depicting the methodology of the present invention.

FIG. 2. depicts one embodiment of the Operational Log 130 and State Log 140 generated by the HybridSync Logging Middleware components 110, 210 that functionally log records that reflect usage of the stored data. Thus, as an application 100-*i* executes, for example, it accesses one or more replicas 120-*j* through the mediation of the HybridSynch Logging Middleware 110. Appropriate entries are made to both the Operation Log 130 and the State Log 140 via HybridSynch Logging Middleware 110.

The Operation Log 130 includes, but is not limited to, a Transaction ID 132, which allows the log records from the same transaction to be grouped together; an Operation ID 134, which identifies the operation that was logged; the Operation Parameters 136; which record the parameters of the operation; the Return Value 138, which records the value returned by the execution of the operation; the Execution Time 141, which records the time required for the execution of the operation; and a Timestamp 142, which records the time at which the operation executed. The State Log 140 includes, but is not limited to, a Transaction ID 232; a Datum ID 234, which identifies the datum; the Old Value 236, which records the old value of the datum; the New Value 238, which records the new value of the datum; the Action Type 241, which records whether the datum was created, updated, or deleted; and a Timestamp 242. It is understood that some embodiments may also record Read operations, in which case the Old and New Values are the same, and the Action Type will be Read.

In the preferred embodiment, the Transaction ID 132 in the Operational Log 130 is the same as the Transaction ID 232 in the State Log 140 so that the logs may be correlated. In the preferred embodiment, transaction semantics are preserved by the synchronization process. Thus, both logs record the Transaction ID. In other embodiments, transaction boundaries are not preserved, and thus the Transaction ID may be omitted, or replaced by another identifier corresponding non-transaction boundaries that will be preserved (e.g. synchronization-session ID).

Figure 3:
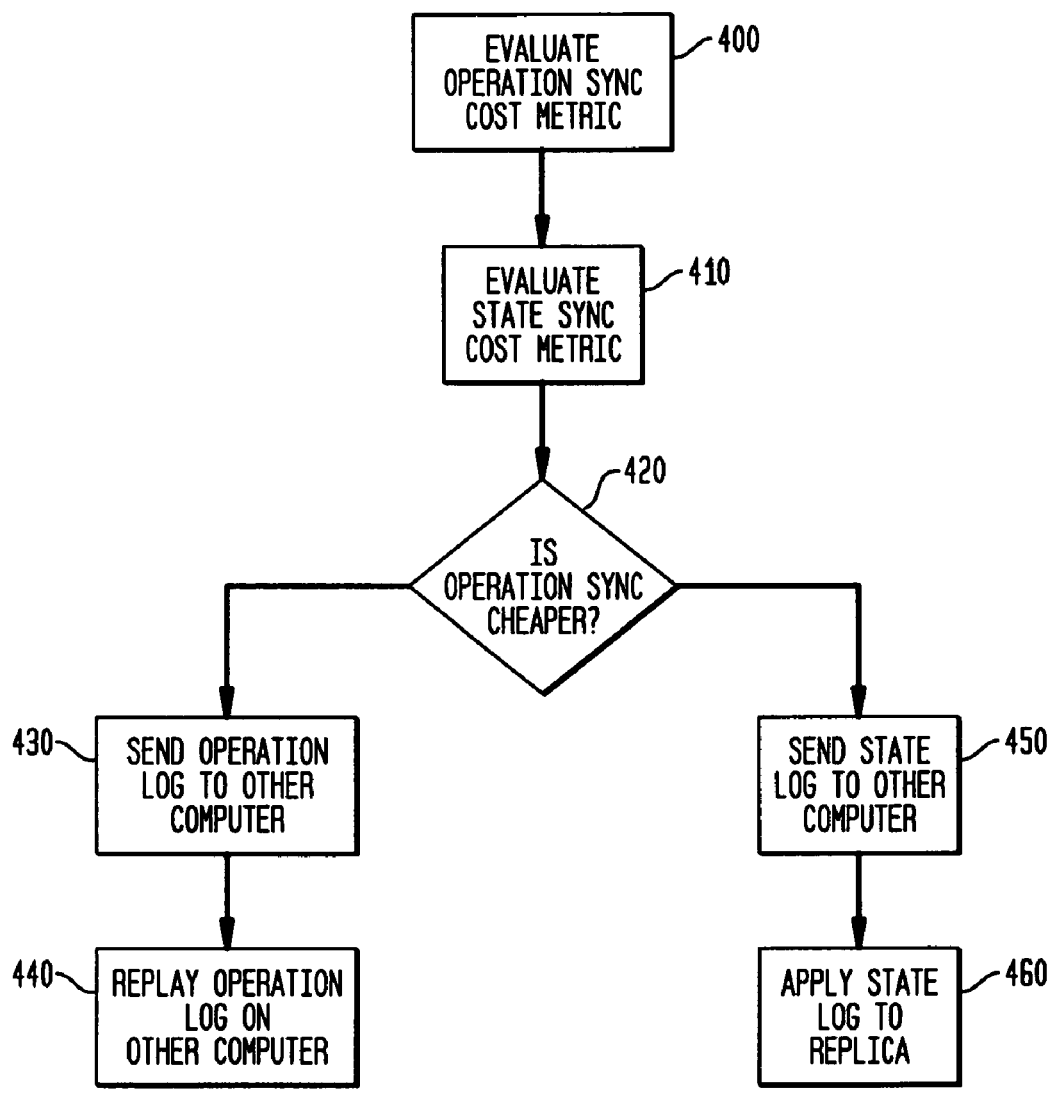

FIG. 3 is a flow chart describing the method according to one embodiment of the present invention. As indicated in a first step 400, a metric is evaluated which calculates the cost of performing operational replay synchronization. In step 410, a metric is evaluated which calculates the cost of performing synchronization via State Synchronization. In step 420, the system calculates which method determined at steps 400, 410 is less costly. If Operational replay Synchronization is less costly, the Operation Log 130 is sent to the other computing devices via a network connection as indicated at Step 430, and then replayed on the other computer as indicated at step 440 by executing the same set of operations with the same arguments against the replica on the other computer. That is, a mechanism is built in to the system such that, when a replica synchronization operation is performed, transactional semantics are preserved.

As the Transaction ID is recorded in both Operation Log 130 and State Log 140 in the preferred embodiment, transaction semantics may easily be preserved by the synchronization process. For example, during the Replay Operation Log (FIG. 3, step 440) and Apply State Log (FIG. 3, step 460) steps, a new transaction would be initiated to replay/apply all log records with identical Transaction IDs, and then commit the transaction. It is understood that this must be performed for each Transaction ID in the same order they were generated.

It is understood that rather than a metric be used in the determination at step 400, a policy may be used instead of a metric to determine which synchronization algorithm to use. For example, "Class A" users may have a policy which specifies that the fastest possible synchronization algorithm should be used, regardless of the cost. In contrast, "Class Z" users may have a policy which specifies that the cheapest possible synchronization should be used, regardless of the synchronization time required.

Alternately, as shown in FIG. 3, if it is determined at step 420 that State Synchronization is less costly, the State Log 140 is sent to the other computer in step 450, and applied to the other replica in step 460 by creating, deleting, and updating data per the State Log 140.

In the embodiment described, the cost metric for Operational replay Synchronization is calculated as the size of the Operational Log 130, and the cost metric for State Synchronization is calculated as the size of the State Log 140. This causes the system to choose the synchronization method which results in the lowest number of bytes being transmitted across the Intermittently-Connected Network 300. In other embodiments, the cost metric may be based on the amount of CPU time required to do the synchronization. For Operational Synchronization, the CPU time may be estimated from the Execution Time in the Operation Log, suitably weighted for the ratio of the CPU speed of Computer 160 versus Computer 260. For State Synchronization, the CPU time may be estimated from the number of entries in the State Log 140 multiplied by the estimated processing time per state change on Computer 260. Those skilled in the art will recognize that many possible metrics exist for different systems.

In the preferred embodiment, the flowchart in FIG. 3 is executed for each transaction, so that the optimal synchronization method may be chosen on a per-transaction basis. In other embodiments, the flowchart may be executed on a per-synchronization-session basis, and the same synchronization algorithm chosen for every transaction in the synchronization session.

In the preferred embodiment, if the optimal synchronization algorithm fails for some reason (e.g. an irreconcilable conflict is detected), the system will attempt to synchronize by using the sub-optimal algorithm.

In one embodiment, the present invention is implemented in a J2EE (Java 2 Platform Enterprise Edition) or Enterprise JavaBean application environment. As known, the J2EE platform consists of a set of services, APIs, and protocols that provide the functionality for developing multi-tiered, Web-based applications. However, it is to be understood that the present invention is not limited to such a particular application environment, nor is it limited to object-oriented systems.

Rather, the invention is more generally applicable to any system in which multiple replicas of a shared data structure must be kept synchronized.

Thus, in an illustrative embodiment, the present invention provides intermittently disconnected computers the ability to: execute applications that comprise, for example, Enterprise JavaBeans (EJBs) methods, reconnect to the server, and propagate application-execution results to the server. As is known, Enterprise JavaBeans (EJBs) serve as a component model for distributed enterprise applications. Like CORBA and DCOM (see Richard Grimes, "Professional DCOM Programming," Wrox Press Inc., 1997, ISBN 186100060X), EJBs are a distributed component model. Entity EJBs encapsulate both "data" (the component's state) and "code" (business logic in the component's methods). Session EJBs typically contain only "code" (business logic in the component's methods). In addition, EJBs automatically supply common requirements of enterprise applications such as persistence, concurrency, transactional integrity, and security. Bean developers focus on the business logic of their application. When deployed to an EJB container, the components are embedded in an infrastructure that automatically supplies the above requirements. For example, the deployer might specify that an Employee Entity bean's state is backed by persistent storage in the Human Resources relational database, specifically in its Employees table. EJBs use declarative transaction management on a per-method basis, so that an "incrementSalary" method, for example, might be declared to require a transactional scope.

It is to be understood that while the illustrative embodiment relates to EJB technology, the invention applies more generally to any application constructed from distributed enterprise components. By way of example, the inventive techniques may be implemented in the framework disclosed in A. Leff et al., "Enterprise JavaBeans and Microsoft Transaction Server: Frameworks for Distributed Enterprise Components," Advances in Computers, Academic Press, vol. 54, pp. 99-152, 1999, ISBN 0120121549, the contents of which is incorporated by reference herein.

The present invention has been described with reference to diagrams of methods, apparatus (systems) and computer program products according to embodiments of the invention. It will be understood that each diagram can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified herein.

These computer program instructions may also be stored in a computer-readable memory that can direct a computer or other programmable data processing apparatus to function in a particular manner, such that the instructions stored in the computer-readable memory produce an article of manufacture including instruction means which implement the functions specified herein.

The computer program instructions may also be loaded onto a computer-readable or other programmable data processing apparatus to cause a series of operational steps to be performed on the computer or other programmable apparatus to produce a computer implemented process such that the instructions which execute on the computer or other programmable apparatus provide steps for implementing the functions specified herein.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for synchronizing replicas of shared data structures of a transactional application performing eager commit after work, associated with one or more computer systems requiring consistency guarantees, at least one said one or more computer system intermittently-connected to other computer systems via a network and executing operations associated with a shared data structure of the transactional application while in a disconnected state, said method comprising:

at a first computer system, while in a disconnected state, logging information related to said executed operations of said shared data structure in both an Operational Log and a State Log; and, when said disconnected first computer system reconnects, dynamically at said time of reconnecting, evaluating a metric for performing a replica synchronization operation on said first computer system according to a first synchronization method using information logged in said Operational Log;

evaluating the metric for performing a replica synchronization operation on said first computer system according to a second synchronization method using information logged in said State Log; and, dynamically selecting, at synchronization time, based on the evaluated metric, whether to use said first or second synchronization methods, and communicating a command to a second computer system to replicate said shared data structure based on said selected synchronization method, said evaluated metric including a cost metric based on an amount of a CPU time required to do a replica synchronization where for said first synchronization method, a first CPU time is estimated from an execution time information relating to said executed operation as logged in the Operational Log when in said disconnected state weighted by the ratio of a CPU speed of said first computer system versus a CPU sped of said second computer system; and, for said second synchronization method, a second CPU time is estimated from a number of entries in the State Log multiplied by an estimated processing time per state change of said second computer; and forwarding one of said Operational Log recorded at said first computer system or said State Log to said second computer system for replica synchronization thereat in accordance with said evaluated cost metric, thereby ensuring consistency across the shared data structures of the transactional application at said one or more computer systems.

2. The method for synchronizing as claimed in claim 1, wherein said first synchronization method comprises a state-based synchronization method.

3. The method for synchronizing as claimed in claim 2, further comprising:

enabling an application executing on a first computer system to access and execute operations on one or more replicas; and, in response to said accessing and executing, generating a State Log to record usage of stored data.

4. The method for synchronizing as claimed in claim 1, wherein said second synchronization method comprises an operational-replay synchronization method.

5. The method for synchronizing as claimed in claim 4, further comprising: enabling an application executing on a first computer system to access and execute operations on one or more replicas, wherein in response to said accessing said executing, a further step of generating an Operational Log to record usage of stored data.

6. The method for synchronizing as claimed in claim 1, further comprising: evaluating said metric based on one or more characteristics of a communications network over which said one or more computer systems communicate.

7. The method for synchronizing as claimed in claim 1, further comprising: evaluating said metric based on relative CPU speeds of said one or more computers.

8. The method for synchronizing as claimed in claim 5, further comprising: evaluating said metric based on one of: a size of said State Log or said Operational Log.

9. The method for synchronizing as claimed in claim 1, wherein said metric is evaluated based on power consumed by a computer system when performing said replicating.

10. The method for synchronizing as claimed in claim 6, wherein said metric is evaluated based on an amount of network bandwidth available.

11. The method for synchronizing as claimed in claim 1, wherein said selecting of said replica synchronization operation is evaluated on a transaction basis.

12. The method for synchronizing as claimed in claim 1, wherein said selecting of said replica synchronization operation is evaluated for an entire synchronization session.

13. The method for synchronizing as claimed in claim 1, further comprising: performing a sub-optimal replica synchronization operation to retry the replica synchronization if an optimal algorithm replica synchronization operation fails.

14. The method for synchronizing as claimed in claim 1, further comprising: selecting, at synchronization time, whether to use said first or second synchronization methods based on a policy.

15. The method for synchronizing as claimed in claim 1, further comprising: wherein said replica synchronization operation preserves transaction semantics.

16. A system for synchronizing replicas of shared data structures of a transactional application performing eager commit after work for one or more computer devices requiring consistency guarantees, at least one said one or more computer devices intermittently-connected to other computer devices via a network and executing operations associated with a shared data structure of the transactional application while in a disconnected state, said method comprising:
   means for logging information related to said executed operations of said shared data structure in both an Operational Log and a State Log at a first computer device while in a disconnected state; and,
   means for executing at said first computer device at said time of reconnecting to said network, for evaluating a metric associated with performing a replica synchronization operation on that reconnected computer device according to first and second synchronization methods using information logged in both said Operational Log and said State Log, respectively;
   means for dynamically selecting, at synchronization time, based on the evaluated metric, whether to use said first or second synchronization methods; and
   means for communicating a command to a second computer device to replicate said shared data structure based on said selected synchronization method, said means forwarding one of said Operational Log or said State Log recorded at said first computer device to said second computer device for replica synchronization in accordance with said evaluated cost metric.
   said evaluated metric including a cost metric based on an amount of a CPU time required to do a replica synchronization where for said first synchronization method, a first CPU time is estimated from an execution time information relating to said executed operation as logged in the Operational Log when in said disconnected state weighted by the ratio of a CPU speed of said first computer device versus a CPU speed of said second computer device; and, for said second synchronization method, a second CPU time is estimated from a number of entries in the State Log multiplied by an estimated processing time per state change of said second computer; and
   forwarding one of said Operational Log recorded at said first computer system or said State Log to said second computer system for replica synchronization thereat in accordance with said evaluated cost metric, thereby ensuring consistency across the shared data structures of the transactional application at said one or more computer systems.

17. The system for synchronizing as claimed in claim 16, wherein said first synchronization method comprises a state-based synchronization method, said metric being evaluated based on parameters provided in a State Log that reflect usage of stored data.

18. The system for synchronizing as claimed in claim 16, wherein said second synchronization method comprises an operational-replay synchronization method, said metric being evaluated based on parameters provided in an Operational Log that reflect usage of stored data.

19. The system for synchronizing as claimed in claim 16, wherein said one or more computer devices intermittently connect to said communications network.

20. The system for synchronizing as claimed in claim 16, wherein said one or more computer devices are adapted for communicating over a communications network defining a distributed client/server environment.

21. The system for synchronizing as claimed in claim 16, wherein said one or more computer devices are adapted for communicating over a communications network defining a peer-to-peer environment.

22. A program storage device readable by a machine, tangibly embodying a program of instructions executable by the machine to perform method steps for synchronizing replicas of shared data structures of a transactional application performing eager commit after work, associated with one or more computer systems requiring consistency guarantees, at least one said one or more computer system intermittently-connected to other computer systems via a network and executing operations associated with a shared data structure of the transactional application while in a disconnected state, said program storage device executing instructions for performing method steps of::
   at a first computer system, while in a disconnected state, logging information related to said executed operations of said shared data structure in both an Operational Log and a State Log; and,
   when said disconnected first computer system reconnects, dynamically at said time of reconnecting, evaluating a metric for performing a replica synchronization operation on said first computer system according to a first synchronization method using information logged in said Operational Log;

evaluating the metric for performing a replica synchronization operation on said first computer system according to a second synchronization method using information logged in said State Log; and, dynamically selecting, at synchronization time, based on the evaluated metric, whether to use said first or second synchronization methods, and communicating a command to a second computer system to replicate said shared data structure based on said selected synchronization method, said evaluated metric including a cost metric based on an amount of a CPU time required to do a replica synchronization where for said first synchronization method, a first CPU time is estimated from an execution time information relating to said executed operation as logged in the Operational Log when in said disconnected state weighted by the ratio of a CPU speed of said first computer system versus a CPU speed of said second computer system; and, for said second synchronization method, a second CPU time is estimated from a number of entries in the State Log multiplied by an estimated processing time per state change of said second computer; and forwarding one of said Operational Log recorded at said first computer system or said State Log to said second computer system for replica synchronization thereat in accordance with said evaluated cost metric, thereby ensuring consistency across the shared data structures of the transactional application at said one or more computer systems.

* * * * *